(12) United States Patent
Huang et al.

(10) Patent No.: US 11,583,810 B2
(45) Date of Patent: Feb. 21, 2023

(54) POROUS SUBSTRATE STRUCTURE AND MANUFACTURING METHOD THEREOF

(71) Applicant: Industrial Technology Research Institute, Hsinchu (TW)

(72) Inventors: Chun-Ju Huang, Hsinchu County (TW); Yen-Hsun Chi, Hsinchu (TW); Bing-Hung Chang, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 192 days.

(21) Appl. No.: 17/120,265

(22) Filed: Dec. 14, 2020

(65) Prior Publication Data

US 2022/0184561 A1 Jun. 16, 2022

(51) Int. Cl.
| | | |
|---|---|---|
| *B01D 53/22* | (2006.01) | |
| *B01D 69/10* | (2006.01) | |
| *B01D 71/02* | (2006.01) | |
| *B01D 69/02* | (2006.01) | |
| *B01D 69/04* | (2006.01) | |

(52) U.S. Cl.
CPC ............ *B01D 69/10* (2013.01); *B01D 69/02* (2013.01); *B01D 69/04* (2013.01); *B01D 71/022* (2013.01); *B01D 2323/28* (2013.01); *B01D 2325/04* (2013.01)

(58) Field of Classification Search
CPC ...... B01D 71/022; B01D 69/04; B01D 69/10; B01D 69/02; B01D 2325/04; B01D 2323/28
See application file for complete search history.

(56) References Cited

U.S. PATENT DOCUMENTS

| | | | | |
|---|---|---|---|---|
| 2,126,017 A | * | 8/1938 | Alexander | ............ C25D 11/08 205/174 |
| 2,930,951 A | * | 3/1960 | Burger | ................... H01G 4/228 205/175 |
| 5,059,870 A | | 10/1991 | Choon | |
| 5,164,632 A | * | 11/1992 | Yoshida | ................ H01J 1/3042 313/309 |
| 5,472,788 A | * | 12/1995 | Benitez-Garriga | .... C25D 11/12 205/174 |
| 8,366,805 B2 | | 2/2013 | Ma et al. | |
| 2005/0061145 A1 | | 3/2005 | Alvin et al. | |
| 2007/0290608 A1 | * | 12/2007 | Choi | ................... H01L 51/5012 313/504 |

(Continued)

FOREIGN PATENT DOCUMENTS

| | | |
|---|---|---|
| CN | 102864476 | 12/2014 |
| CN | 104918682 | 9/2015 |

(Continued)

OTHER PUBLICATIONS

"Office Action of Taiwan Counterpart Application", dated Jun. 21, 2021, p. 1-p. 10.

*Primary Examiner* — Anthony R Shumate
(74) *Attorney, Agent, or Firm* — JCIPRNET

(57) ABSTRACT

Provided are a porous substrate structure and a manufacturing method thereof. The porous substrate structure includes a substrate, an anodic aluminum oxide layer and a double metal oxide layer. The substrate has a plurality of pores. The anodic aluminum oxide layer is disposed on the substrate. The double metal oxide layer is disposed on the anodic aluminum oxide layer.

15 Claims, 3 Drawing Sheets

(56) References Cited

U.S. PATENT DOCUMENTS

| | | | |
|---|---|---|---|
| 2008/0014355 A1 | 1/2008 | Chao et al. | |
| 2010/0131946 A1 | 5/2010 | Degaonkar et al. | |
| 2010/0132546 A1* | 6/2010 | Ma | C01B 3/505 95/55 |
| 2010/0219079 A1 | 9/2010 | Routkevitch et al. | |
| 2012/0037792 A1* | 2/2012 | Tzeng | C25D 15/00 977/773 |
| 2012/0099063 A1* | 4/2012 | Hung | G02F 1/133707 349/123 |
| 2012/0194813 A1* | 8/2012 | Tzeng | G01N 21/658 977/773 |
| 2012/0247203 A1* | 10/2012 | Zhang | G01N 27/223 73/335.04 |
| 2014/0202952 A1 | 7/2014 | Afzulpurkar et al. | |
| 2015/0091043 A1* | 4/2015 | Shur | H01L 33/44 438/22 |
| 2020/0324039 A1* | 10/2020 | Kim | A61M 1/3678 |
| 2021/0307160 A1* | 9/2021 | Ahn | H05K 1/115 |

FOREIGN PATENT DOCUMENTS

| | | |
|---|---|---|
| JP | H1085568 | 4/1998 |
| JP | 2000189772 | 7/2000 |
| JP | 2017124364 | 7/2017 |
| KR | 101349011 | 1/2014 |
| KR | 20170131967 | 12/2017 |
| TW | 200927275 | 7/2009 |
| TW | I365101 | 6/2012 |
| TW | 201326461 | 7/2013 |
| TW | 201332631 | 8/2013 |
| TW | 201332731 | 8/2013 |
| TW | I449808 | 8/2014 |
| WO | 03076050 | 9/2003 |

\* cited by examiner

POROUS SUBSTRATE STRUCTURE AND MANUFACTURING METHOD THEREOF

TECHNICAL FIELD

The present disclosure relates to a porous substrate structure and a manufacturing method thereof.

BACKGROUND

Description of Related Art

Due to the particularity of the palladium membrane in the mass transfer of hydrogen gas, the palladium membranes are formed on the surface of the porous substrate for hydrogen filtration. By dissociating hydrogen gas molecules on the surface of the palladium membrane and penetrating through the membrane, hydrogen molecules can be separated from other gas molecules. Generally speaking, the thickness of the palladium membrane is used as an indicator of hydrogen filtration performance. In other words, in order to increase the hydrogen permeability of the palladium membrane, the thickness of the palladium membrane must be reduced, and the defects of the membrane must be reduced as much as possible to increase the density of the palladium membrane.

In addition, by modifying the surface of the porous substrate, for example, forming a modified layer, the thickness of the palladium film with the required density can be reduced. However, if the thickness of the modified layer on the porous substrate is too large, it may cause insufficient adhesion of the modified layer and the modified layer may be peeled off from the porous substrate.

SUMMARY

The present disclosure provides a porous substrate structure, wherein an anodic aluminum oxide layer is disposed between a substrate and a modified layer (a double metal oxide layer).

The present disclosure provides a manufacturing method of a porous substrate structure, wherein an anodic aluminum oxide layer is formed between a substrate and a modified layer (a double metal oxide layer).

A porous substrate structure of the present disclosure includes a substrate, an anodic aluminum oxide layer and a double metal oxide layer. The substrate has a plurality of pores. The anodic aluminum oxide layer is disposed on the substrate. The double metal oxide layer is disposed on the anodic aluminum oxide layer.

A manufacturing method of a porous substrate structure of the present disclosure includes the following steps. An anodic aluminum oxide layer is formed on a substrate, wherein the substrate has a plurality of pores. A double metal oxide layer is formed on the anodic aluminum oxide layer.

To make the aforementioned more comprehensible, several embodiments accompanied with drawings are described in detail as follows.

DESCRIPTION OF THE EMBODIMENTS

Figure 1A:
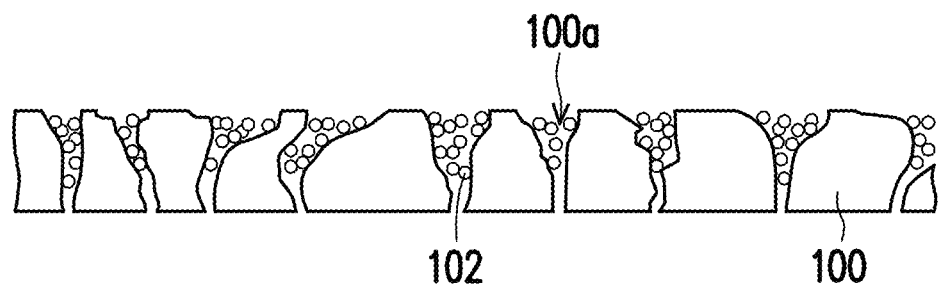
FIGS. 1A to 1D are schematic cross-sectional views of a manufacturing method of a porous substrate structure according to an embodiment of the present disclosure.

The embodiments are described in detail below with reference to the accompanying drawings, but the embodiments are not intended to limit the scope of the present disclosure. In addition, the drawings are for illustrative purposes only and are not drawn to the original dimensions. For the sake of easy understanding, the same elements in the following description will be denoted by the same reference numerals.

The terms mentioned in the text, such as "comprising", "including" and "having" are all open-ended terms, i.e., meaning "including but not limited to".

In addition, in the text, the range represented by "a value to another value" is a summary expression way to avoid listing all the values in the range one by one in the specification. Therefore, the record of a specific numerical range covers any numerical value within the numerical range, as well as a smaller numerical range defined by any numerical value within the numerical range.

In addition, the directional terms mentioned in the text, such as "on" and "under", are merely used to refer to the drawings and are not intended to limit the present disclosure.

FIGS. 1A to 1D are schematic cross-sectional views of a manufacturing method of a porous substrate structure according to an embodiment of the present disclosure. The porous substrate structure of the embodiment of the present disclosure allows gas to pass through and is applied to gas treatment such as separation gas (for example, hydrogen filtration).

Referring to FIG. 1A, a substrate 100 is provided. In the present embodiment, the material of the substrate 100 may be porous stainless steel, but the present disclosure is not limited thereto. In other embodiments, the material of the substrate 100 may be porous ceramic. The substrate 100 has a plurality of pores 100a for gas penetration. The pore diameter of the pores 100a is, for example, between 1 μm and 30 μm. The substrate 100 may be a tubular substrate or a sheet-shaped substrate, but the present disclosure is not limited thereto.

Then, according to actual needs, filling particles 102 may be filled in the pores 100a. In this way, when the pores 100a have a relatively large pore size, filling the filling particle 102 in the pores 100a may reduce the pore size of the pores 100a, which can prevent the layer subsequently formed on the substrate 100 from sinking into the pores 100a, causing the surface of the layer to be uneven or blockage of pores 100a. In addition, filling the filling particle 102 in the pores 100a may improve the uneven pore size of the pores 100a.

The material of the filling particles 102 is, for example, aluminum oxide, silicon oxide, calcium oxide, cerium oxide, titanium oxide, chromium oxide, manganese oxide, iron oxide, nickel oxide, copper oxide, zinc oxide, zirconium oxide or a combination thereof. Under the premise that the filling particles 102 may not completely fill the pores 100a, the present disclosure does not limit the particle size of the filling particles 102.

In addition, when the pores 100a have a relatively small pore size, since the layer subsequently formed on the substrate 100 is not easy to sink into the pores 100a, there is no need to fill the filling particles 102 in the pores 100a.

Figure 1B:
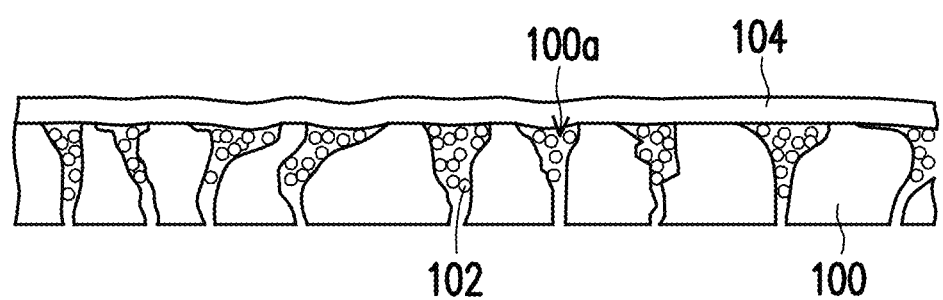

Referring to FIG. 1B, an aluminum layer 104 is formed on the substrate 100. The thickness of the aluminum layer 104 does not exceed 3 μm, for example. The forming method of the aluminum layer 104 is, for example, vacuum evaporation or electroless plating.

Figure 1C:
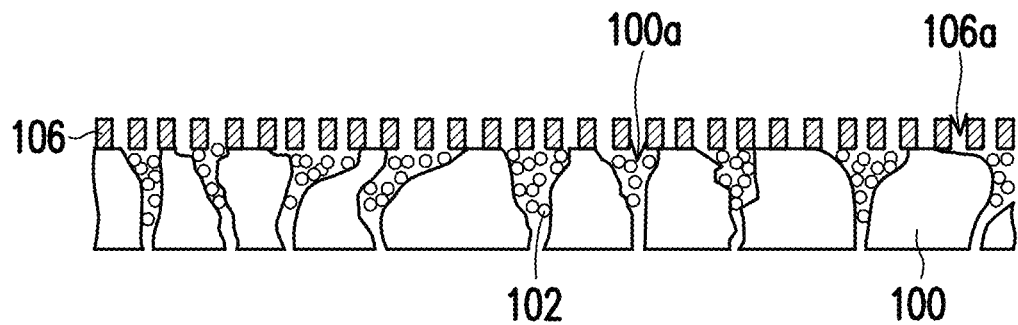

Referring to FIG. 1C, an anodization is performed on the aluminum layer 104 to form an anodic aluminum oxide (AAO) layer 106. After the anodization, the formed anodic aluminum oxide layer 106 has a plurality of pores 106a penetrating therethrough. The pores 106a expose the substrate 100 and the pores 100a for gas penetration. In the embodiment of the present disclosure, since the thickness of the aluminum layer 104 does not exceed 3 μm, for example, the pores 106a may penetrate the anodic aluminum oxide layer 106 after the anodic aluminum oxide layer 106 is formed by anodization. When the thickness of the aluminum layer 104 exceeds 3 μm, the formed pores 106a may not penetrate the anodic aluminum oxide layer 106. As a result, the gas may not penetrate the anodic aluminum oxide layer 106 and the substrate 100.

In addition, after the anodization, the aluminum layer 104 is converted to the anodic aluminum oxide layer 106 with a flat surface and high porosity. Therefore, the anodic aluminum oxide layer 106 may be used as a modification layer of the substrate 100 to improve the flatness of a layer subsequently formed thereon. In the present embodiment, when the pores 100a has a relatively large pore size, the aluminum layer 104 is prevented from sinking into the pores 100a since the filling particles 102 is filled in the pores 100a. Therefore, the aluminum layer 104 may have a flat surface and may not block the pores 100a. In this way, the formed anodic aluminum oxide layer 106 may have higher surface flatness, and the gas may effectively penetrate the anodic aluminum oxide layer 106 and the substrate 100.

Figure 1D:
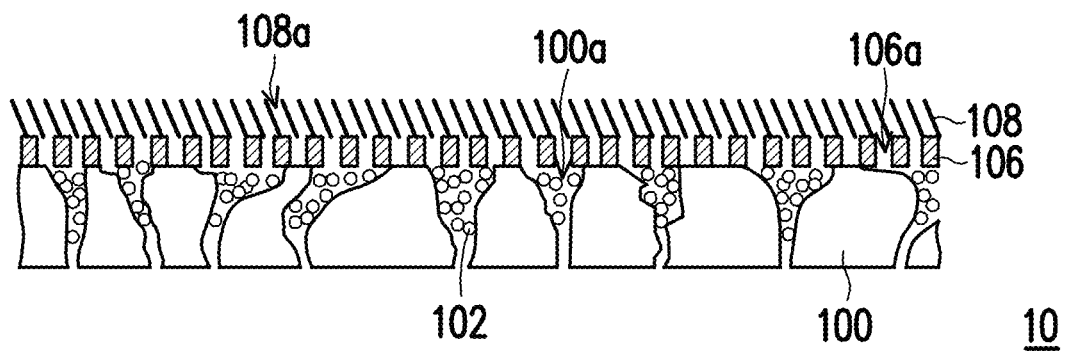

Referring to FIG. 1D, a double metal oxide layer 108 is formed on the anodic aluminum oxide layer 106 to form the porous substrate structure 10 of the embodiment of the present disclosure. The double metal oxide layer 108 has pores 108a for gas penetration. In the embodiment of the present disclosure, the material of the double metal oxide layer 108 includes double metal oxide. In an embodiment, the double metal oxide may be lithium aluminum oxide, for example. In addition, in some embodiments, the double metal oxide may be a layered double metal oxide, which may be represented by Formula 1,

$$[M^{II}_{1-x}M^{III}_{x}]O_y \qquad \text{Formula 1}$$

wherein $M^{II}$ is $Mg^{2+}$, $Zn^{2+}$, $Fe^{2+}$, $Ni^{2+}$, $Co^{2+}$, $Cu^{2+}$ or $Li^+$; $M^{III}$ is $Al^{3+}$, $Cr^{3+}$, $Fe^{3+}$ or $Sc^{3+}$; x is between 0.2 and 0.33; and y is between 0.7 and 2. In addition, in the embodiment of the present disclosure, the method for forming the double metal oxide layer 108 includes, for example, the following steps. A layered double hydroxide (LDH) layer (not shown) is formed on the anodic aluminum oxide layer 106. Then, the double metal hydroxide layer is calcined to obtain a double metal oxide layer. The method for forming the double metal hydroxide layer on the anodic aluminum oxide layer 106 may be electroless plating, hot dip plating, physical vapor deposition, chemical vapor deposition, a co-precipitation method or a hydrothermal method, but the present disclosure is not limited thereto. The double metal hydroxide is a precursor of the double metal oxide, which may be converted to double metal oxide through high temperature treatment (such as calcining process). In addition, the temperature of the calcining process is about 300° C. to 500° C.

In the embodiment of the present disclosure, the thickness of the double metal oxide layer 108 is less than 3 μm. In detail, since the anodic aluminum oxide layer 106 is formed on the substrate 100, a thinner double metal oxide layer may be used to achieve the modification effect, thereby improving the adhesion of the double metal oxide layer 108 on the substrate 100. As a result, the thickness of the double metal oxide layer 108 may be reduced to less than 3 μm, so as to avoid the problem of insufficient adhesion due to excessive thickness in order to improve the surface flatness, which may cause the double metal oxide layer 108 to peel off. When the thickness of the double metal oxide layer 108 is reduced, the gas throughput may also be increased.

In addition, since the anodic aluminum oxide layer 106 has a flat surface, the double metal oxide layer 108 formed on the anodic aluminum oxide layer 106 may also have a flat surface. In this way, the double metal oxide layer 108 may be used as a modification layer of the substrate 100, and the subsequently formed layer may have fewer defects and higher density.

In the embodiment of the present disclosure, the porous substrate structure 10 includes the substrate 100 with pores 100a, the anodic aluminum oxide layer 106 with pores 106a and the double metal oxide layer 108 with pores 108a. Therefore, the porous substrate structure 10 may allow gas to pass through, and may be applied to gas treatment such as separation of gas (for example, hydrogen filtration). The structure and gas penetration characteristics of the porous substrate structure 10 are further described below.

EXAMPLE 1

The pores at the surface of a porous stainless steel tube (PSS, Pall Accusep filter, P/N: 7CC6L465236235SC02) are filled with alumina particles, wherein the average particle size of alumina particles is 10 μm. Next, the stainless steel tube filled with alumina particles is placed in a vacuum evaporation apparatus for the surface evaporation. 1 g of aluminum ingot is placed on the target stage in the cavity of the vacuum evaporation apparatus, and a vacuum pump is used to pump the cavity pressure below $1\times10^{-4}$ torr. The stainless steel tube is rotated to be evaporated and the target stage is heated to form a very thin aluminum layer (less than 3 μm) on the surface of the stainless steel tube. Next, the stainless steel tube with the aluminum layer is anodized to obtain a stainless steel tube with an anodic aluminum oxide layer on the surface.

AlLi intermetallic compound powder (the content of Li is about 18 wt. % to 21 wt. % based on the total weight of the AlLi intermetallic compound) is placed in 1000 mL of pure water. Next, nitrogen is introduced, aerating, and stirring to make parts of the AlLi intermetallic compound powder are reacted with water to be dissolved. Then, the impurities are filtered to obtain a clear basic solution containing $Li^+$ and $Al^{3+}$, wherein the pH value is about 11.0 to 12.3.

The stainless steel pipe with the anodic aluminum oxide layer is immersed in the basic solution containing $Li^+$ and $Al^{3+}$ for about 2 hours and then dried, so that a layered lithium-containing aluminum hydroxide layer with a continuous phase is coated on the anodic aluminum oxide layer. Next, the stainless steel tube is calcined at 500° C. for two hours to form a layered lithium aluminum oxide layer on the anodic aluminum oxide layer, wherein the thickness of the layered lithium aluminum oxide layer is about 2.9 μm, to obtain a porous substrate structure.

COMPARATIVE EXAMPLE 1

Except that the anodic aluminum oxide layer is not formed, a porous substrate structure is formed in the same manner as the Example 1. In the Comparative Example 1, the thickness of the lithium aluminum oxide layer is about 6.4 μm.

Figure 2A:
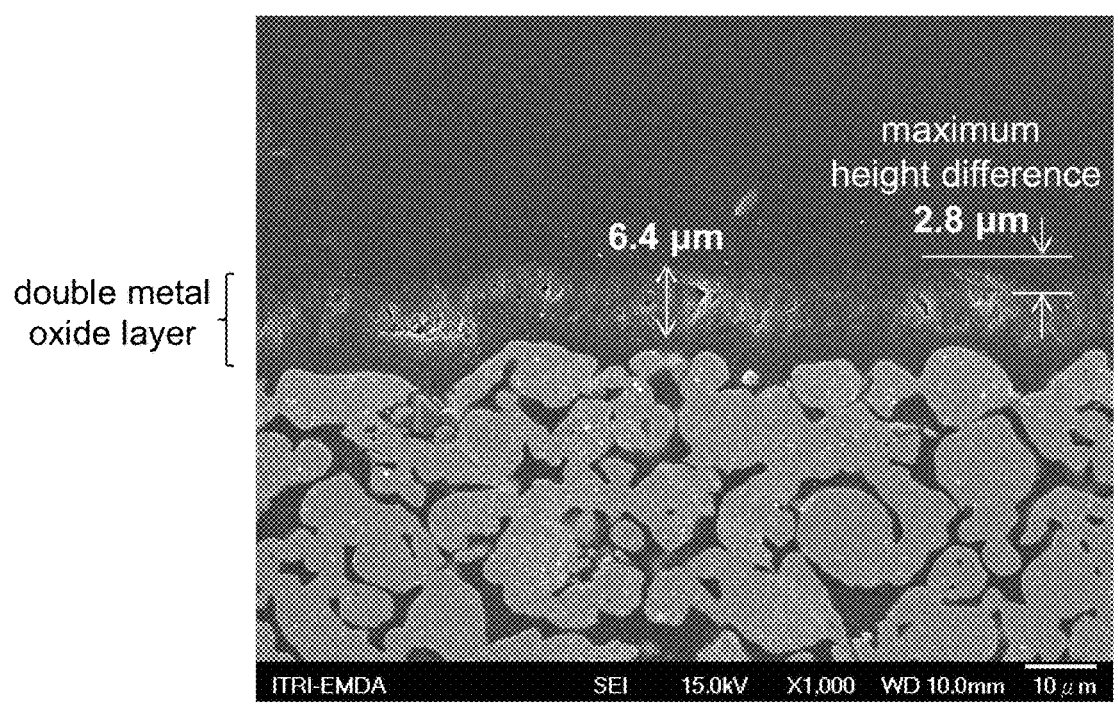
FIG. 2A is a cross-sectional image of a porous substrate structure in which a double metal oxide layer is directly formed on a substrate.
Figure 2B:
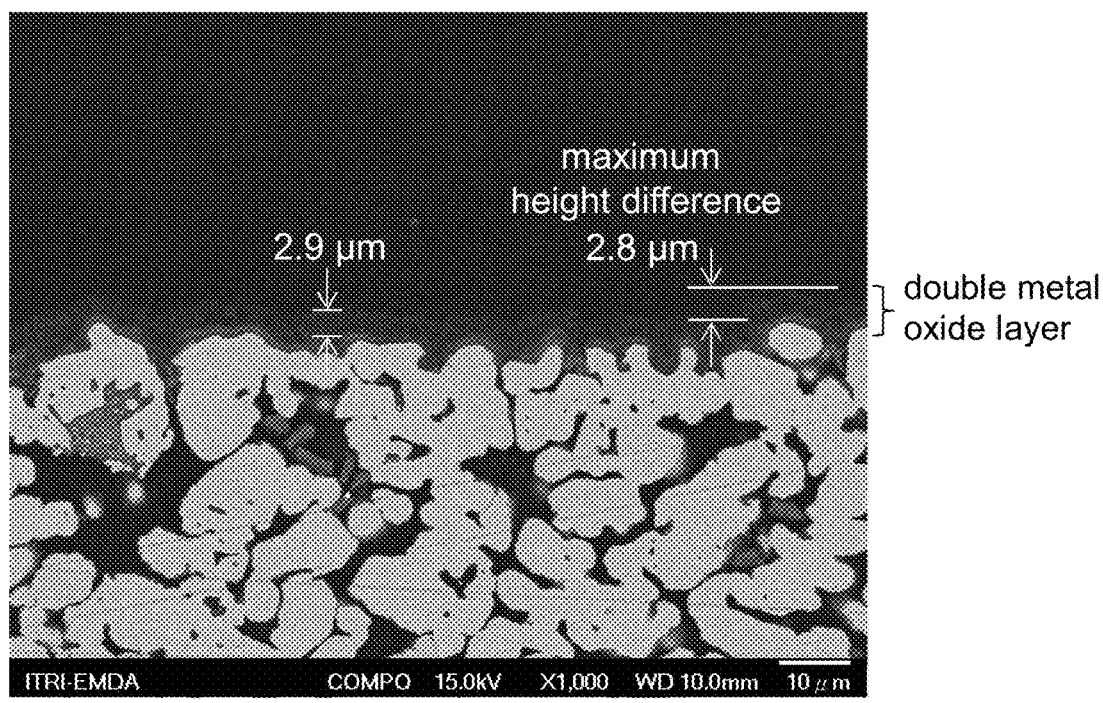
FIG. 2B is a cross-sectional image of a porous substrate structure of an embodiment of the present disclosure.

FIG. 2A is a cross-sectional image of the porous substrate structure of the Comparative Example 1. FIG. 2B is a cross-sectional image of the porous substrate structure of the Example 1. It can be seen from FIGS. 2A and 2B that the double metal oxide layer may have a thinner thickness under the required flatness (the maximum height difference at the surface is 2.8 μm) when an anodic aluminum oxide layer is disposed between the double metal oxide layer and the substrate, and thus the double metal oxide layer may be effectively prevented from peeling off from the substrate.

In addition, the porous substrate structures of the Example 1 and the Comparative Example 1 (the metal oxide layer is directly formed on the substrate) were tested for gas permeability. The results are shown in Table 1.

Gas Permeability Test

The porous substrate structure to be measured is placed in the test chamber, and then nitrogen gas is introduced into the test chamber, and the pressure value is monitored by a pressure gauge. The nitrogen flowing out of the open end of the test chamber is measured by a flow meter, and the nitrogen flux at a specific pressure is calculated.

TABLE 1

| | nitrogen flux ($m^3/m^2$-hr-atm) |
|---|---|
| Example 1 | 107 |
| Comparative Example 1 | 85 |

It can be seen from FIG. 2A, FIG. 2B and Table 1 that in the Example 1, since an anodic aluminum oxide layer is disposed between the porous substrate and the modified layer (the double metal oxide layer), the modified layer (the double metal oxide layer) may have a thinner thickness under the same flatness condition, and have a higher gas flux. That is, the porous substrate structure of the Example 1 may have a higher gas permeability.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A porous substrate structure, comprising:
   a substrate, having a plurality of pores;
   an anodic aluminum oxide layer, disposed on the substrate; and
   a double metal oxide layer, disposed on the anodic aluminum oxide layer,
   wherein the double metal oxide layer comprise layered double metal oxide represented by Formula 1, $$[M^{II}_{1-x}M^{III}_{x}]O_y \qquad \text{Formula 1}$$

wherein $M^{II}$ is $Mg^{2+}$, $Zn^{2+}$, $Fe^{2+}$, $Ni^{2+}$, $Co^{2+}$, $Cu^{2+}$ or $Li^+$; $M^{III}$ is $Al^{3+}$, $Cr^{3+}$, $Fe^{3+}$ or $Sc^{3+}$; x is between 0.2 and 0.33; and y is between 0.7 and 2.

2. The porous substrate structure of claim 1, wherein the thickness of the double metal oxide layer is less than 3 μm.

3. The porous substrate structure of claim 1, wherein the thickness of the anodic aluminum oxide layer does not exceed 3 μm.

4. The porous substrate structure of claim 1, further comprising filling particles disposed in the plurality of pores, wherein the material of the filling particles comprises aluminum oxide, silicon oxide, calcium oxide, cerium oxide, titanium oxide, chromium oxide, manganese oxide, iron oxide, nickel oxide, copper oxide, zinc oxide, zirconium oxide, or a combination thereof.

5. The porous substrate structure of claim 1, wherein the material of the substrate comprises stainless steel or ceramic.

6. A manufacturing method of a porous substrate structure, comprising:
   forming an anodic aluminum oxide layer on a substrate, wherein the substrate has a plurality of pores; and
   forming a double metal oxide layer on the anodic aluminum oxide layer,
   wherein the double metal oxide layer comprise layered double metal oxide represented by Formula 1, $$[M^{II}_{1-x}M^{III}_{x}]O_y \qquad \text{Formula 1}$$

wherein $M^{II}$ is $Mg^{2+}$, $Zn^{2+}$, $Fe^{2+}$, $Ni^{2+}$, $Co^{2+}$, $Cu^{2+}$ or $Li^+$; $M^{III}$ is $Al^{3+}$, $Cr^{3+}$, $Fe^{3+}$ or $Sc^{3+}$; x is between 0.2 and 0.33; and y is between 0.7 and 2.

7. The manufacturing method of claim 6, wherein the thickness of the double metal oxide layer is less than 3 μm.

8. The manufacturing method of claim 6, wherein the method for forming the double metal oxide layer comprises:
   forming a double metal hydroxide layer on the anodic aluminum oxide layer; and
   performing a calcining treatment on the double metal hydroxide layer.

9. The manufacturing method of claim 8, wherein the method for forming the double metal hydroxide layer comprises electroless plating, hot dip plating, physical vapor deposition, chemical vapor deposition, co-precipitation or a hydrothermal method.

10. The manufacturing method of claim 8, wherein the double metal hydroxide layer comprises layered double metal hydroxide.

11. The manufacturing method of claim 6, wherein the thickness of the anodic aluminum oxide layer does not exceed 3 μm.

12. The manufacturing method of claim 6, wherein the method for forming the anodic aluminum oxide layer comprises:
   forming an aluminum layer on the substrate; and
   anodizing the aluminum layer.

13. The manufacturing method of claim 12, wherein the method for forming an aluminum layer on the substrate comprises vacuum evaporation or electroless plating.

14. The manufacturing method of claim 12, further comprising filling the plurality of pores with filling particles before forming the aluminum layer.

15. The manufacturing method of claim 6, wherein the material of the substrate comprises stainless steel or ceramic.

* * * * *